United States Patent [19]

Simmons

[11] 4,034,354
[45] July 5, 1977

[54] PROGRAMMABLE INTERFACE CONTROLLER FOR NUMERICAL MACHINE SYSTEMS

[75] Inventor: Richard W. Simmons, Ann Arbor, Mich.

[73] Assignee: The Bendix Corporation, Southfield, Mich.

[22] Filed: Nov. 21, 1975

[21] Appl. No.: 634,299

[52] U.S. Cl. .............................................. 364/900
[51] Int. Cl.² ................. G05F 19/18; G05F 11/18; G06F 3/04
[58] Field of Search ..................... 445/1; 340/172.5

[56] References Cited

UNITED STATES PATENTS

| | | | |
|---|---|---|---|
| 3,668,653 | 6/1972 | Fair et al. | 340/172.5 |
| 3,701,113 | 10/1972 | Chace et al. | 340/172.5 |
| 3,741,246 | 6/1973 | Braytenbah | 340/172.5 |
| 3,753,243 | 8/1973 | Ricketts et al. | 340/172.5 |
| 3,806,714 | 4/1974 | Otsuka et al. | 340/172.5 |
| 3,810,104 | 5/1974 | Markley | 340/172.5 |
| 3,816,723 | 6/1974 | Slawson | 235/151.11 |
| 3,821,526 | 6/1974 | Anderson | 340/172.5 |
| 3,827,030 | 7/1974 | Seipp | 340/172.5 |
| 3,875,391 | 4/1975 | Shapiro et al. | 340/172.5 |
| 3,881,172 | 4/1975 | Bartlett et al. | 340/172.5 |
| 3,959,755 | 5/1976 | Valassis et al. | 340/172.5 |

Primary Examiner—Harvey E. Springborn
Assistant Examiner—Jan E. Rhoads
Attorney, Agent, or Firm—James R. Ignatowski

[57] ABSTRACT

A programmable interface controller capable of assuming specific sequential control functions is disclosed. The disclosed controller is a slave device under the direct control of the numerical control computer and is effectively transparent to numerical control machine system. Upon a first command the interface controller receives and stores data from the numerical control computer. The stored data is processed in accordance with an internal program and the results of the processing temporarily stored therein. Upon a second command, the results of the processing are returned to the numerical control computer from where they are distributed via the systems bi-directional bus to the machine as well as to operating routines elsewhere in the numerical control system. The programmable interface controller performs Boolean and logic arithmetic on the data received from the numerical control computer and is capable of assuming the control functions of prior art magnetics as well as other sequential control functions normally performed by the numerical control computer.

18 Claims, 10 Drawing Figures

INSTRUCTION CODE AND INSTRUCTED OPERATION

| Instruction Code | Octals Code | Instruction Mnemonic | Operation |
|---|---|---|---|
| 0000 | 00 | NCP(0) | Unprogrammed - No Operation |
| 0001 | 01 | ADA | "AND" input data "D" and data "A" store in Accumulator A |
| 0010 | 02 | ADCA | "AND" complement of input data "D" and data A, store in Accumulator A |
| 0011 | 03 | ODA | "OR" input data D and data A store in Accumulator A |
| 0100 | 04 | ODCA | "OR" complement of input data "D" and data "A", store in Accumulator "A" |
| 0101 | 05 | LAD | "Load" input data "D" in Accumulator A |
| 0110 | 06 | LACD | "Load" complement of input data "D" in Accumulator A |
| 0111 | 07 | CA | "Load" complement of data "A" in Accumulator A |
| 1000 | 10 | CMDA | "Compare" input data "D" with data "A" store logic "1" in Accumulator A if "D" and "A" are alike. Store logic "0" in Accumulator A if "D" and "A" are different. |
| 1001 | 11 | LBD | "Load" input data "D" in Accumulator B |
| 1010 | 12 | LBA | "Load" data "A" in Accumulator B |
| 1011 | 13 | PEA | Program Enable from data "A" load data "A" in Accumulator "E" |
| 1100 | 14 | PED | Program Enable from input data D Load input data "D" in Accumulator E |
| 1101 | 15 | SO | Set output - "AND" data "A" and data "B", store in Output or Scratch Pad Memory if and only if present status of Accumulator E is a logic "1" |
| 1110 | 16 | EOP | End of Program - Reset Program Scanner to zero. Exit compute state |
| 1111 | 17 | NOP(1) | Programmed - No Operation |

Input data "D" = Data specified by the address portion of Program Memory Instruction Word.
Data "A" = Present Content of Accumulator A
Data "B" = Present Content of Accumulator B

PROGRAMMABLE INTERFACE CONTROLLER FOR NUMERICAL MACHINE SYSTEMS

BACKGROUND OF THE INVENTION

1. Field of the Invention

The invention is related generally to the field of numerically controlled machines for machining parts in accordance with a prepared program and, in particular, the invention relates to an auxiliary processor in the form of a programmable interface controller assuming specific sequential control functions.

2. Prior Art

The advent of electronic computers for accurately solving complex problems in a quick and efficient manner has led to the rapid development of numerically controlled machines for making limited numbers of relatively complex parts. These numerical control machines basically comprise a program reader, a controller, an input/output interface and a machine being controlled. A set of instructions, called a program, is prepared and permanently recorded on a convenient recording media, such as magnetic or punched tape. The program reader reads the recorded program and translates the recorded instructions into electrical signals compatible with the controller. The controller, in the form of an electronic numerical control computer, responds to the signals from the program reader and signals indicative of the state of the machine and generates signals to control the machine to perform each set of instructions contained in the program in their proper sequence. In the course of the development of numerical control machines, it has been found that many sequential functions can be controlled more efficiently and expeditiously by an auxiliary processor rather than embodying these functions in the computer or in the program itself. The auxiliary processor acquires input data from the normal input and output devices associated with the machine, as well as those provided by the numerical control computer and analyzes this information by performing logical arithmetic on the status of the various inputs and outputs and generates appropriate output signals as a result. The output signals may be directed to the numerical control computer, to the machine through an appropriate interface or both. The output signals may be directed to the numerical control computer, to the machine through an appropriate interface or both. The output signals directed to the numerical control computer are used to activate switches or status lights on the control panel while the output signals directed to the machine itself activates solenoids, relays, lights, motors, etc., as may be necessary or desired.

The first generation of auxiliary processors were multiple contact relay and/or discrete solid state switch networks handwired according to the various arithmetic logic functions desired. These handwired networks usually referred to as "magnetics", although fairly complex and relatively expensive, were still less expensive than if these same functions were embodied in the program or in the control computer. These auxiliary processors substantially reduced the storate requirements and work load of the control computer. It has been found that whenever there is a significant change in the auxiliary processor, it is more economical and expedient to construct a new network rather than rewire the old one. These handwired auxiliary processors still remain relatively expensive, time consuming and undesirable from a cost effective point of view.

The present generation of auxiliary processors have switched from the handwired multiple contact relay or discrete solid state switch networks discussed above to electronically programmable controller. T. J. Markley, in U.S. Pat. No. 3,810,104 "Programmable Magnetics for a Numerical Control System" (May 7, 1974), discloses a programmable interface controller serially disposed between the numerical control computer and the machine and performs both conventional computer interface functions, as well as the auxiliary processor functions of the prior art magnetics. The Markley system further receives and stores auxiliary inputs from the numerical control computer which are utilized in the programmed operation to operate the machine tool input devices. The system disclosed by Markley, however, does not utilize the full potential of a programmable controller, such as disclosed by W. H. Seipp in U.S. Pat. No. 3,827,030 "Programmable Controller Using a Random Access Memory" (July 30, 1974) and in the publications cited therein. This type of programmable controller has expanded capabilities and may also be used to make routine calculations normally performed by the numerical control computer, as well as performing the control functions of the prior art auxiliary processors. These factors would both simplify the program and reduce the work load on the numerical control computer.

The invention is an improved electronically programmable controller interfacing the numerical controlled computer through a bi-directional bus capable of performing additional sequential control functions, as well as those functions performed by the conventional relay or discrete solid state functions discussed above.

BRIEF DESCRIPTION OF THE DRAWINGS

FIG. 7 is a table showing a typical operation code with the corresponding instruction.

SUMMARY OF THE INVENTION

The invention is a programmable interface controller for a numerical control machine system capable of performing sequential control normally performed by prior art magnetics. The disclosed controller is a "slave" device under the direct control of the numerical computer. As a slave device, the disclosed controller is effectively transparent to the normal operation of the system. The programmable interface controller comprises, input, output and scratch pad random access memories for storing data, a program memory storing a plurality of instruction words in a predetermined sequence, each instruction word consisting of a multi-bit operation code and multi-bit address field indicative of a storage location in said input, output and scratch pad memory, a program scanner generating binary numbers sequentially addressing each instruction word in the program memory, an instruction processor for performing the instructed operation in accordance with said operation code and said address field, and a master control controlling data flow between the numerical control computer and the programmable interface controller in response to commands from the numerical control computer. In operation the numerical control computer first interrogates and acquires data from various sources, including the machine sensors, the program reader, as well as operator inputs to the numerical control systems' control panel. This data is systemically stored in the numerical control computer's memory in the form of tables and thereby represents at any time a "snap shot" of the current status of all inputs to the numerical control system. The computer then transfers this data to the programmable interface controller via the systems bi-directional bus. The master control gates this data to the input random access memory where it is stored. Upon completion of the data transfer, the computer transmits a start command which causes the master control to raise a busy flag and also signals the program scanner to sequentially address one at a time, each instruction word in the program memory. The instruction processor performs each instructed operation until all of the instructions in the program memory are executed. The final results of the instructed operations are stored in the output random access memory in storage locations specified by the instruction word address field. Intermediate results which are to be used in subsequent operations during the execution of the program are stored in the scratch pad random access memory. The final instruction word of the program is an end of program code which signals the master control that the data has been processed and the final results are stored in the output random access memory. In response to a signal indicative of the end of the program, the master controller drops its busy flag and awaits instructions from the numerical control computer to transfer the results stored in the output random access memory back to predetermined storage locations in the computers table. The programmable interface then awaits for new data from the computer. The data stored in the computer's table is distributed via the systems bi-directional bus to machine as well as to operating routines elsewhere in the numerical control system.

The object of the invention is a programmable interface system capable of performing the functions of prior art magnetics which is transparent to the numerical control machine system. Another object of the invention is an interface controller which is a slave to the numerical control computer. Still another object, is an interface controller having alternate modes of operation which permit the numerical control computer to test the operation of various internal elements. A further objective is an interface controller having a read only memory function as instruction processor. These and other advantages of the disclosed programmable interface controller will be evident from a reading of the following specification and drawings.

DETAILED DESCRIPTION OF THE PREFERRED EMBODIMENT

Figure 1:
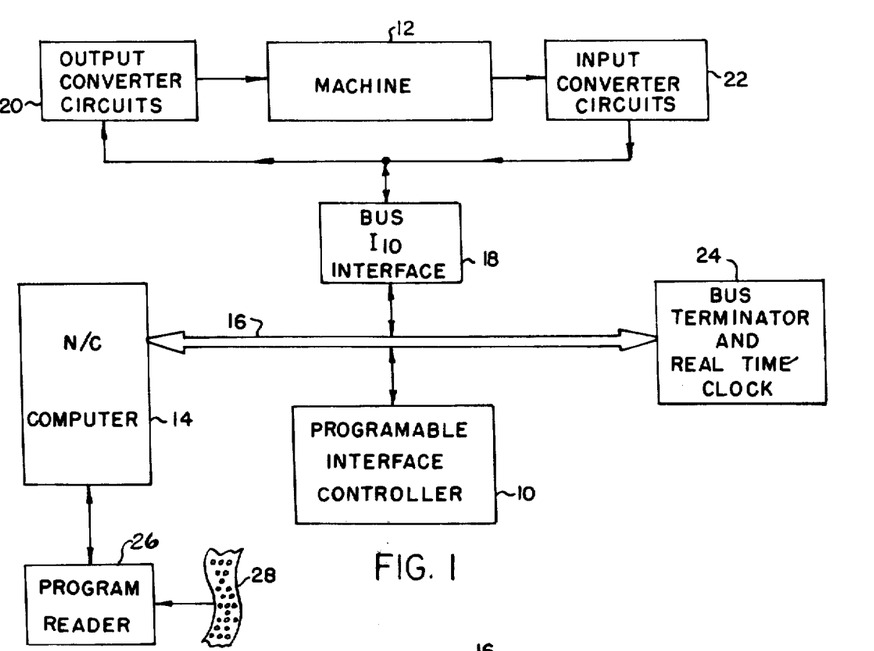
FIG. 1 is a block diagram of a numerical control machine system embodying the disclosed Programmable Interface Controller.

The block diagram of FIG. 1 illustrates the relationship of the disclosed Programmable Interface Controller 10 to a numerical control machine system. The numerical control machine system basically comprises an appropriate electrically actuated Machine 12 contolled in response to control signals generated by a Numerical Control (N/C) Computer 14. The N/C Computer outputs the coded control signals on a Bi-Directional Data and Control Bus 16 which are transmitted to the Machine 12 through a Bus Input/Output (I/O) Interface 18 and Output Converter Circuits 20. The Bus I/O Interface decodes the control signals appearing on the Bi-Directional Data and Control Bus 16 and applies them to the appropriate output converter circuit where they are converted to electrical signals compatible with the machine. The converted signals may operate solenoids, relays, lights, motor contactors, etc. as directed. The Machine 12 further includes sensor devices which generate signals indicative of the present status of the machine. These sensor devices may generate signals indicative of the position of the part being machined, the position of the tool, the direction of motion of the part and/or the tool, which tool is being used, the rotational direction of the spindle, whether or not the coolant is flowing, etc. The signals from the machine sensors are converted to digital form by the Input Converter Circuits 22 and communicated to the N/C Computer via the Bus I/O Interface 18 and the Bi-Directional Data and Control Bus 16. A bus Terminator and Real Time Clock 24 contols the data flow between the elements of the system and provides real time clock signals regulating the data flow rate.

The N/C Computer 14 generates the control signals in response to the input signals generated by the machine associated sensor devices signals input directly into the N/C Computer by the operator, and the signals from a Program Reader 26 sequentially converting a set of recorded instructions called a Program into electrical signal compatible with the language of the N/C Computer. The Program is illustrated as Punched Tape 28. However, it is recognized that other types of program storage media, other than a punched tape, may be used.

The Programmable Interface Controller 10 is an auxiliary processor assuming the responsibility of all or any specific portion thereof of the sequential control functions which normally would have to be performed by the auxiliary processors of the prior art, by the N/C Computer, or included in the original program. In the disclosed system the N/C Computer 14 gathers input data from Punched Tape 28, the operator inputs from its control panel and the data from the machine sensor devices and stores this data in tablet form in its core memory. The Programmable Interface Controller 10, hereinafter referred to as PIC, acquires input data from the N/C Computer 14 through the Bi-Directional Data and Control Bus 16, analyzes this data by performing logical arithmetic on the status of the various inputs and output data and stores the results. Upon a subsequent command from the N/C Computer, these results, in the form of logic level signals, are returned to the N/C Computer 14 where they are stored in tablet form. The N/C Computer may either output these results to the Machine 12 to energize or deenergize solid state switches capable of activating conventional solenoids, relays, lights, motor contactors, etc., or may internally utilize these results in the computation of control signals or activate lights on the control panel.

Figure 2:
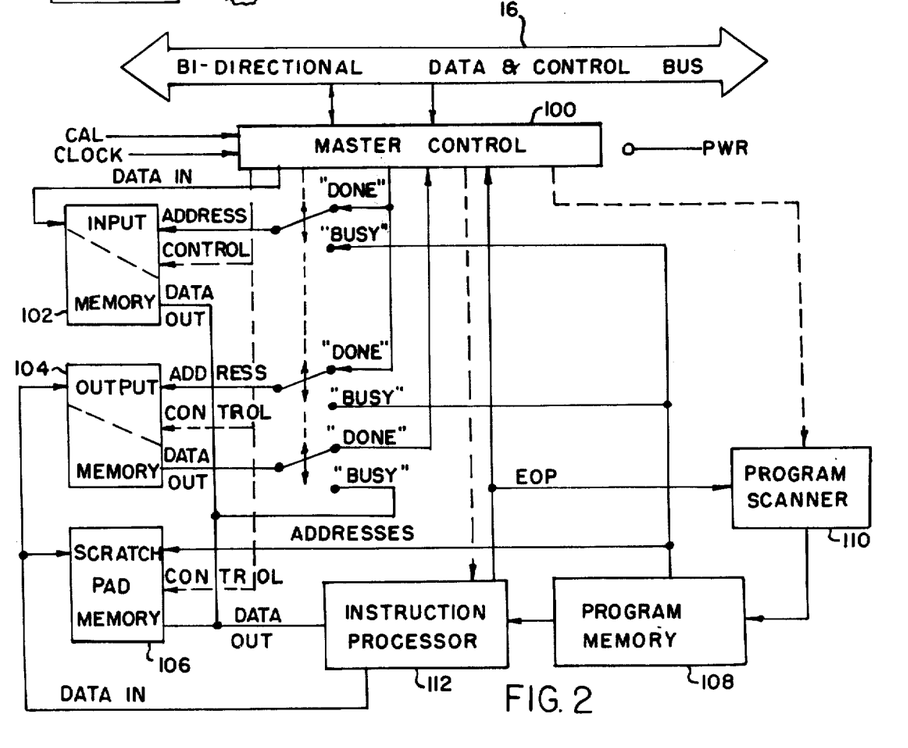
FIG. 2 is a block diagram of the disclosed Programmable Interface Controller.

The details of the Programmable Interface Controller 10 are further delivered in the block diagram illustrated in FIG. 2. The Programmable Interface Controller 10 comprises a Master Control 100 interfacing with the Bi-Directional Data and Control Bus 16, an Input Memory 102 storing the input data from the N/C Computer, an Output Memory 104 storing the results of the data processing, a Scratch Pad Memory 106 temporarily storing intermediate results during the data processing, a Program Memory 108 storing in a sequential order, a set of instructions containing the operation to be performed and the memory address of the data to be used, a Program Scanner 110, sequentially addressing the memory locations of the Program Memory, and an Instruction Processor 112 receiving the addressed instruction from the Program Memory and performing the instructed operation with the requisite data.

The operation of the PIC is as follows: The N/C Computer 14 first interrogates and acquires data from the various sources of input data, including the Program Reader 26, the machines sensor devices, as well as the N/C Computers own control panel. This data is systematically stored in the form of tablets in the N/C Computer's memory and thereby represents, at any time, a snap-shot of the current status of all inputs to the control system. The N/C Computer 14 then transfers this data to the PIC via the Bi-Directional Data and Control Bus 16. The Master Control 100 gates this data directly into the Input Memory 102 where it is stored. The Input Memory 102 is a commercially available 256 × 1 bit bipolar random access memory artifically divided into two partitions, each partition containing 128 storage locations. The first 128 storage locations are reserved for numerical control data while the second 128 storage locations are inputs from the machine associated sensor device.

Upon completion of the input data transfer, the N/C Computer transmits a "start" command to the PIC. The Master Control 100 sets a "busy" flag and activates the Program Scanner 110. The Program Scanner addresses, one at a time in sequence, each memory location in the Program Memory 108. The content of the addressed memory location is a 16 bit Instruction Word consisting of a 4 bit operation code and a 12 bit data address field. The 4 bit operation code is interpreted and executed by the Instruction Processor 112. The data used by the Instruction Processor 112 during the execution of a specific instruction may be contained in the Input Memory 102, Scratch Pad Memory 106 or Output Memory 104, as specified by the 12 bit data address field of the instruction word. After each instructed operation is completed, the Program Scanner addresses the next sequential memory location in the Program Memory and the Instruction Processor again executes the stored instruction. This process continues until all of the stored instructions have been executed. The last instruction in the Program Memory is an "End of Program" (EOP) instruction. This instruction terminates the sequential scanning of the Program Memory and resets the Program Scanner to the beginning (zero) and signals the Master Control that all operations have been completed and the results have been placed in their proper location in the Output Memory 104. In response to the end of program signal, the Master Control drops the busy flag and raises its "done" flag. The N/C Computer 14 then is able to read the content of the Output Memory 104 into a table in its core memory during the next sequential interrupt operation. From this table, the data is distributed via the Bi-Directional Data and Control Bus 16 to the Bus I/O Interface 16, as well as to the necessary N/C operating routines contained elsewhere in the N/C computer operating program. After the N/C Computer has read the content of the Output Memory 104, the PIC stands ready to receive new data and repeat the program.

The Programmable Interface Controller is a "slave device" which does not provide any direct control functions for the Numerical Control Machine System. Because the PIC is a slave device under the direct control of the N/C Computer, the operation of the PIC is effectively transparent to the operation of the Numerical Control Machine System.

PROGRAM SCANNER

Figure 3:
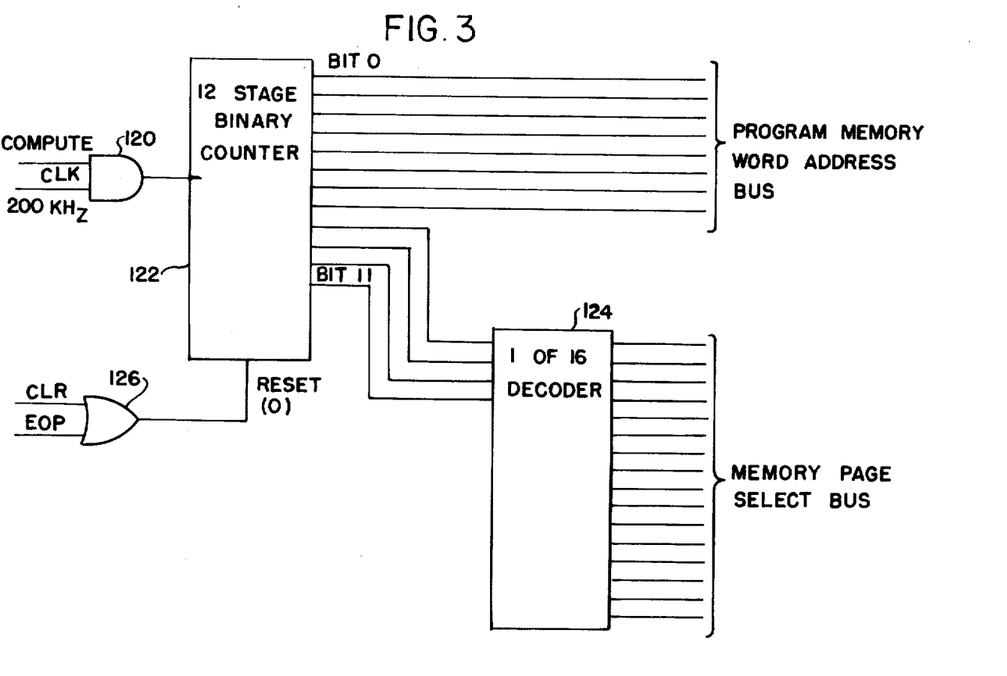
FIG. 3 is a circuit diagram of the Program Scanner.

The details of the Program Scanner 110 are illustrated in FIG. 3. The Program Scanner comprises an Input AND Gate 120 receiving clock signals at one input terminal and is enabled by a Compute Signal from the Master Control 100 input terminal. When Input AND Gate 120 is enabled, the clock signals are counted by a 12 state Binary Counter 122 to generate sequential Program Memory Word Addresses. The first 8 data bits (bits 0 through 7) of the Binary Counter 12 bit output are the sequential addresses on each page in the Program Memory while the last 4 bits are decoded by a 1 of 16 Decoder 124 to generate signals sequentially enabling each page in the Program Memory. The Binary Counter 122 is reset to 0 through OR Gate 126 in response to a "clear" or "End of Program" (EOP) instruction signal.

PROGRAM MEMORY

Figure 4:
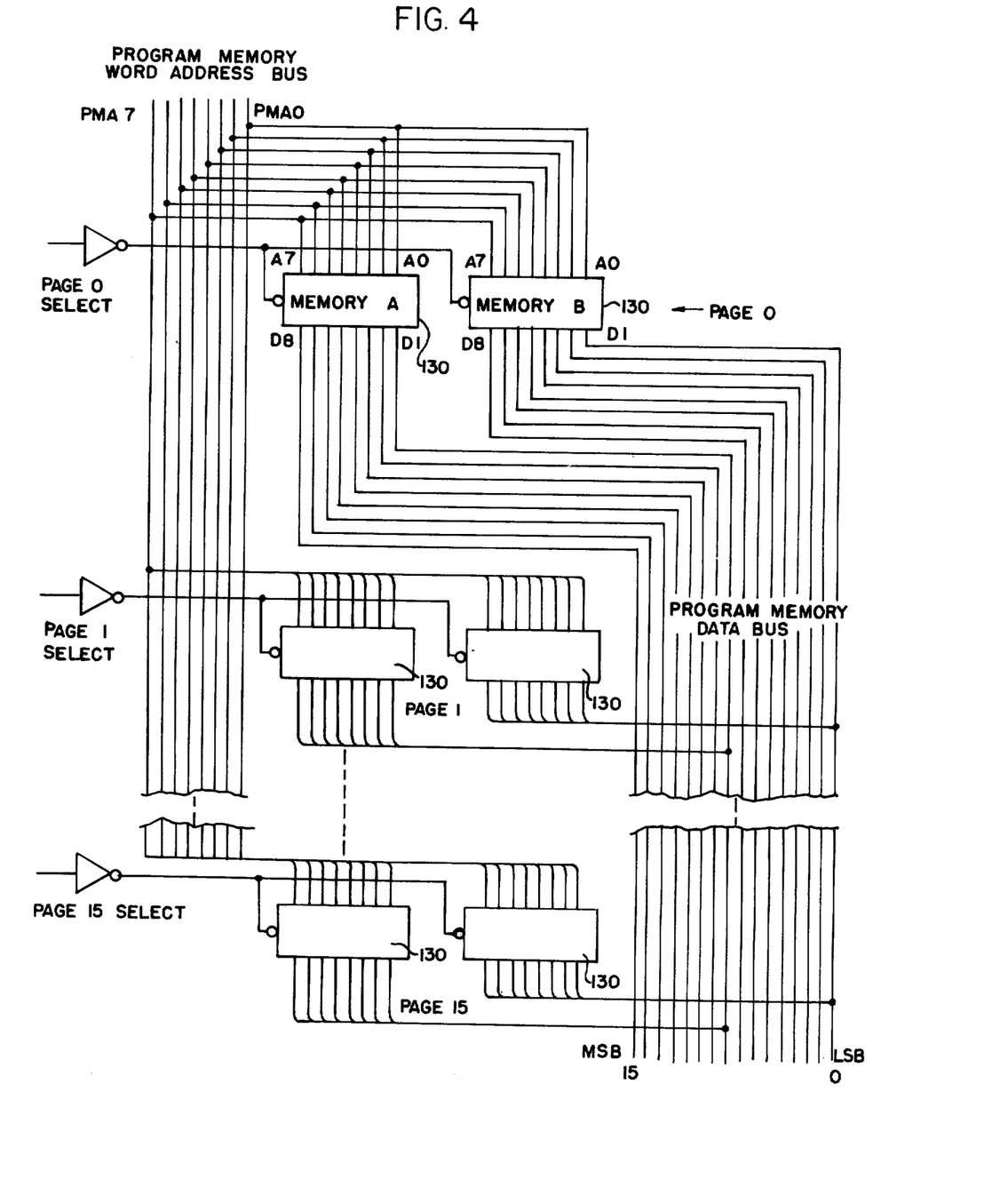
FIG. 4 is a circuit diagram of the Program Memory.

The Program Memory 108 comprises an expandable array of Programmable Read-Only Memories 130 or Erasable Programmable Read-Only Memories (EPROM's), as shown in FIG. 4. The Programmable of Erasable Programmable Memories are commercially available from Intel Corporation of Santa Clara, California, as well as other sources. The Erasable Programmable Read-Only Memories are preferred because they offer all of the advantages of the Programmable Read-Only Memories and have the added advantage of being erasable permitting a more economical correction of programming errors. The basic memory comprises at least two memory chips, each of which is organized as a 256 × 8 bit array. The two chips are cascaded, as shown, to form a "Page" of 256, sixteen bit Instruction Words. The Program Memory 108 is expandable from a minimum one page having 256 Instruction Words to 16 pages having 4,096 Instruction Words.

Figure 5:
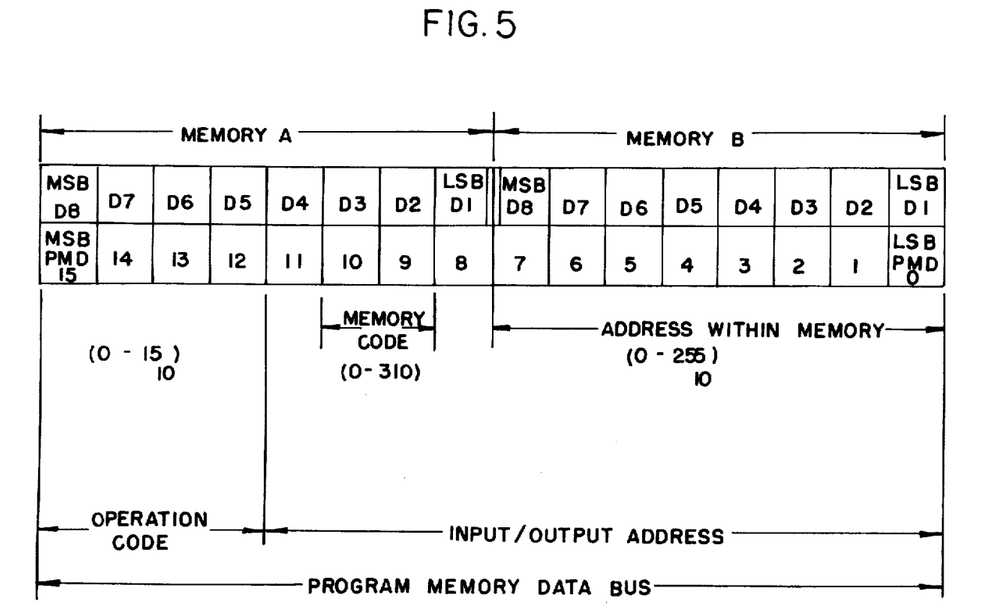
FIG. 5 is a bus diagram of the Instruction Word.

A bus representation of an Instruction Word is illustrated on FIG. 5. Each Instruction Word stored in the Program Memory contains two pieces of information pertinent to the operation of the PIC during its program execute cycle. The first piece of information is a 12 bit binary representation of the location (address field) of the stored status data in the Input Memory 102, Scratch Pad Memory 106 and Output Memory 104. The remaining four bits are a binary representation of an instruction telling specifically what operation is to be performed on the bits of data specified by the address portion of the word. As can be seen from the bus representation illustrated on FIG. 5, the first four high order bits represent the operation to be performed by the Instruction Processor 112, while the twelve lower order bits is the address field where the data to be acted upon is located or where the results of the processing is to be stored. The second and third bits of the twelve bit address field identifies the memory, input, scratch pad, or output where the desired data is located or to be stored, and the last eight bits define the specific location in the specified memory. The first and fourth bits are not used. A typical code arrangement, the associated operation or instruction and its mnemonics, are shown on the Table, FIG. 7. A six digit Octal code may be used to describe each operation for the Instruction Words in the Program Memory. The Octal numbering system is convenient in relating real inputs and outputs to their respective locations within the Input, Scratch Pad and Output Memory Arrangement of the PIC.

INSTRUCTION PROCESSOR

Figure 6:
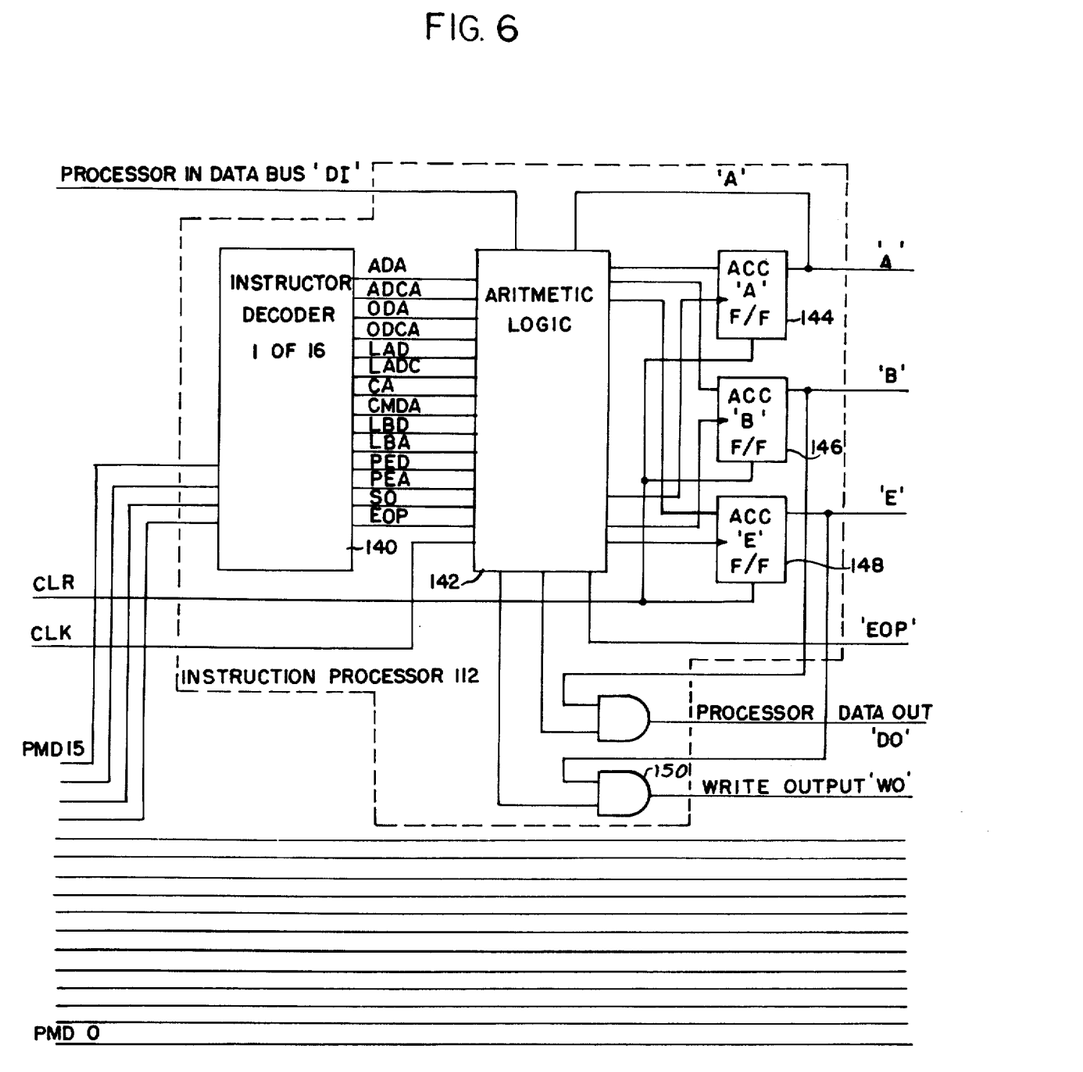
FIG. 6 is a block diagram of the Instruction Processor.

The details of the Instruction Processor 112 are illustrated on FIG. 6. The Instruction Processor comprises and Instruction Decoder 140 receiving the four bit operation code from the Program Memory. The Instruction Decoder 140 is a commercially available device, such as a read-only memory which decodes the operation code and outputs a signal indicative of 1 of 16 possible operations to the Arithmetic Logic 142. The Arithmetic Logic 142 operates in coordination with a first accumulator 144 designated Accumulator A, a second accumulator 146, designated Accumulator B and a third accumulator 148 designated as Accumulator E to perform the instructed operation on the data specified by the address field portion of the Instruction Word. The operations to be performed by the Arithmetic Logic 142 are those listed on FIG. 7. These sixteen operations may be categorized into three basic types: 1) load data into a designated accumulator from the input memory 102, scratch pad memory 106, output memory 104 of from one accumulator to the other; 2) perform the instructed arithmetic logic with the specified data, and 3) store the results of the specified operation in the locations in the Scratch Pad Memory 106 or Output Memory 104 specified by the address field portion of the Instruction Word.

The operation of the instruction processor 112 is as follows: The four bit operation code from the program memory is decoded by the instruction decoder 140 and places an enable signal on the appropriate input to the Arithmetic Logic 142. The enable signal activates appropriate logic elements in the Arithmetic Logic 142 to perform the instructed operation. The results of the load and logic arithmetic functions may be stored in Accumulator A 144, Accumulator B 146, or Accumulator E 148. The Set Output (SO) signal and the content of the Accumulator E 148 are applied to independent input terminals of AND Gate 150 which generates a Write Output (WO) signal when the state of the Accumulator E is a logical 1 and the Arithmetic Logic is generating a Set Output (SO) signal. The Write Output signal activates both the Scratch Pad Memory 106 and the Output Memory 104 to store the AND content an Accumulator A 144 and Accumulator B 146 in the memory location specified by the Instruction Word. If the state of Accumulator E 148 is not a logical 1, no Write Output signal is generated and no data transfer to the memories takes place. Accumulator E and AND Gate 150 cooperate to allow an effective "jump" under data control to be programmed into the PIC.

Figure 8:
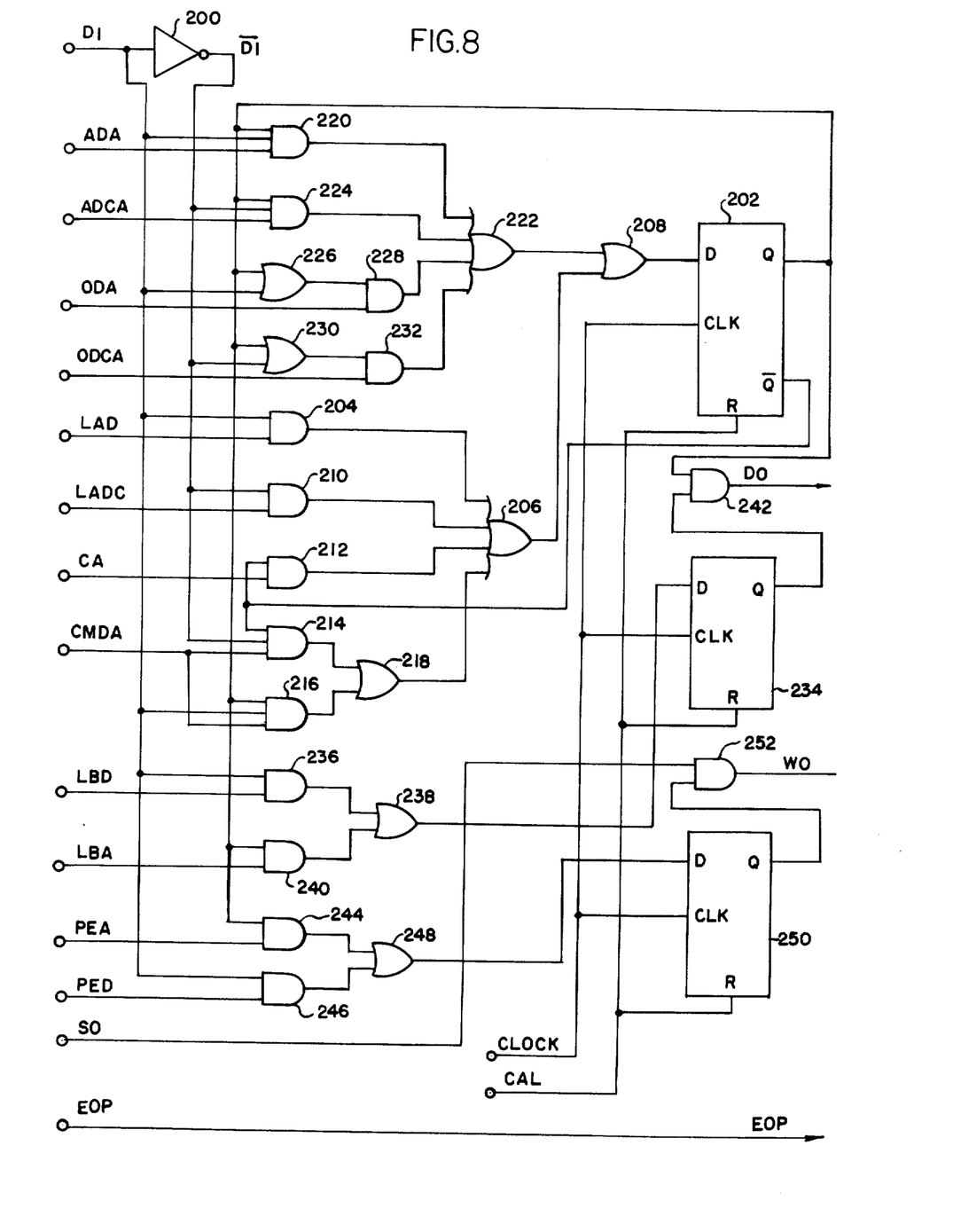
FIG. 8 is a circuit diagram of a hardwired embodiment of the Arithmetic Logic.

The basic form of the Arithmetic Logic 142 is shown in the circuit diagram illustrated in FIG. 8. Each input lead from the Instruction Decoder 140 is connected to corresponding logic circuit in the Arithmetic Logic. The Input Data (DI) from the memory location specified by the address field portion of the Instruction Word is applied to an Inverter Amplifier 200 which produces the complement of the Input Data ($\overline{DI}$). As previously indicated, the result of the Arithmetic Logic operation is temporarily stored in Accumulators A, B and E illustrated as Flip Flops 202, 234 and 250 respectively.

Flip Flop 202 is initially loaded with either Input Data (DI) or its complement $\overline{DI}$ by a signal appearing on the input leads from the Instruction Decoder 140 designated LAD and LADC, respectively. The mnemonics used in this discussion are the same given on FIG. 7. AND Gate 204 receives the Input Data DI and responds to a signal on the LAD lead and sets the state of Flip Flop 202 with the logical state of the Input Data through OR Gates 206 and 208, respectively. AND Gate 210 receives the complement of the Input Data ($\overline{DI}$) and responds to a signal on the LADC lead and alternatively sets the state of Flip Flop 202 with the logical state of the Complement of the Input Data ($\overline{DI}$). AND Gate 212 receives a signal indicative of the complement of the logical state of Flip Flop 202 and responds to a signal on the lead designated CA to change the logical state of Flip Flip 202 to the complement of its prior state through OR Gates 206 and 208. AND Gate 214 receives the complement of the Input Data ($\overline{DI}$) and the complement of the logical state of Flip Flop 202 ($\overline{A}$) and the signal on the lead designated CMDA and produces a signal indicative of the logical AND of $\overline{DI}$ and $\overline{A}$. AND Gate 216 receives the Input Data (DI), a signal indicative of the logical state (A) of Flip Flop 202 and the signal on the lead designated CMDA and produces a signal indicative of the logical AND of DI and A. The outputs of AND Gates 214 and 216 are logically OR'ed by OR Gate 218 and set the state of Flip Flop 202 through OR Gates 206 and 208. If the state of the Input Data (DI) and the state of Flip Flop 202 are the same, either AND Gate 214 or 216 will produce a logical 1 and will set the state of Flip Flop 202 to a logical 1. However, if the state of the Input Data (DI) and the state of Flip Flop 202 are different, both AND Gate 214 and 216 will produce a logical 0 output and the state of Flip Flop 202 will be set to a logical 0. AND Gate 220 responds to a signal on lead designated ADA and produces an output indicative of the logical AND of the Input Data (DI) and the state of the present state of the data (A) stored in Flip Flop 202. The output of AND Gate 220 sets the logical state of Flip Flop 202 through OR Gates 222 and 208. AND Gate 224 responds to a signal on the lead designated ADCA and produces an output which is the logical AND of the complement of the Input Data (DI) and the state of the data (A) stored in Flip Flop 202. The output of AND Gate 224 is stored in Flip Flop 202 through OR Gates 222 and 208. OR Gate 226 logically OR's the Input Data $\overline{DI}$ and the present state of the stored in Flip Flop 202 and produces a resultant signal at the input of AND Gate 228. AND Gate 228 responds to a signal on the lead designated ODA and sets the state of Flip Flop 202 with logical state of the resultant signal generated by OR Gate 226 through OR Gates 222 and 228. In a like manner, OR Gate 230 and AND Gate 232 set the state of Flip Flop 202 to the logic OR of the complement of the Input Data ($\overline{DI}$) and initial state of the data A stored in Flip Flop 202 in response to a signal on the lead designated ODCA.

Accumulator B illustrated as Flip Flop 234 is loaded with the Input Data (DI) through AND Gate 236 and OR Gate 238 in response to a signal on the lead designated LBD. In a like manner, the state of Flip Flop 234 is set to the logical state of Flip Flop 202 through AND Gate 240 and OR Gate 238 in response to a signal on the lead designated LBA.

The Output Data (DO) is produced at the output terminal of AND Gate 242 receiving signals from Accumulators A and B. The Output Data (DO) is the logical "AND" of the state of both Accumulators A and B, Flip Flop 202 and 234, respectively.

Accumulator E illustrated as Flip-Flop 250 is loaded with Input Data (DI) through AND Gate 246 and OR Gate 248 in response to a signal on the lead designated PED. In a like manner, the state of Flip-Flop 250 is loaded with state of Accumulator A Flip-Flop 202, through AND Gate 244 and OR Gate 248 in response to a signal on the lead designated PEA.

AND Gate 252 receives a signal from the output of Accumulator E, Flip-Flop 250 and from the lead designated SO carrying a signal indicative of an instruction to write the Output Data "DO" in the Scratch Pad or Output Memories. AND Gate 252 produces a Write Output (WO) Signal when the state of Accumulator E is signal enabling AND Gate 252.

Appropriate Clear (CAL) and Clock (CLK) signals are applied to Flip Flops 202, 234 and 250, as shown.

It is recognized that in actual practice, it is often desirable to use a logical 1 (ground signal) as the enabling signals rather than logical 1 signals as employed in the logic circuitry discussed above. Therefore, a person skilled in the art could readily design logic circuitry embodying complementary NAND and NOR elements which would respond to the complements of the discussed signals to effectively perform the same functions.

Figure 9:
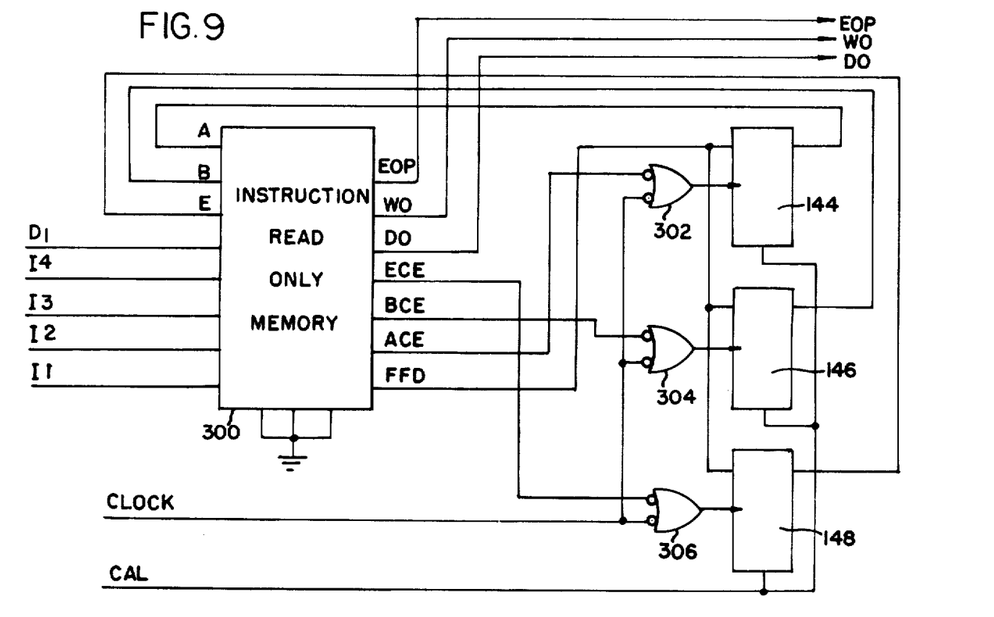
FIG. 9 is a circuit diagram of an alternate embodiment of the Arithmetic Logic using a read-only memory.
Figure 10:
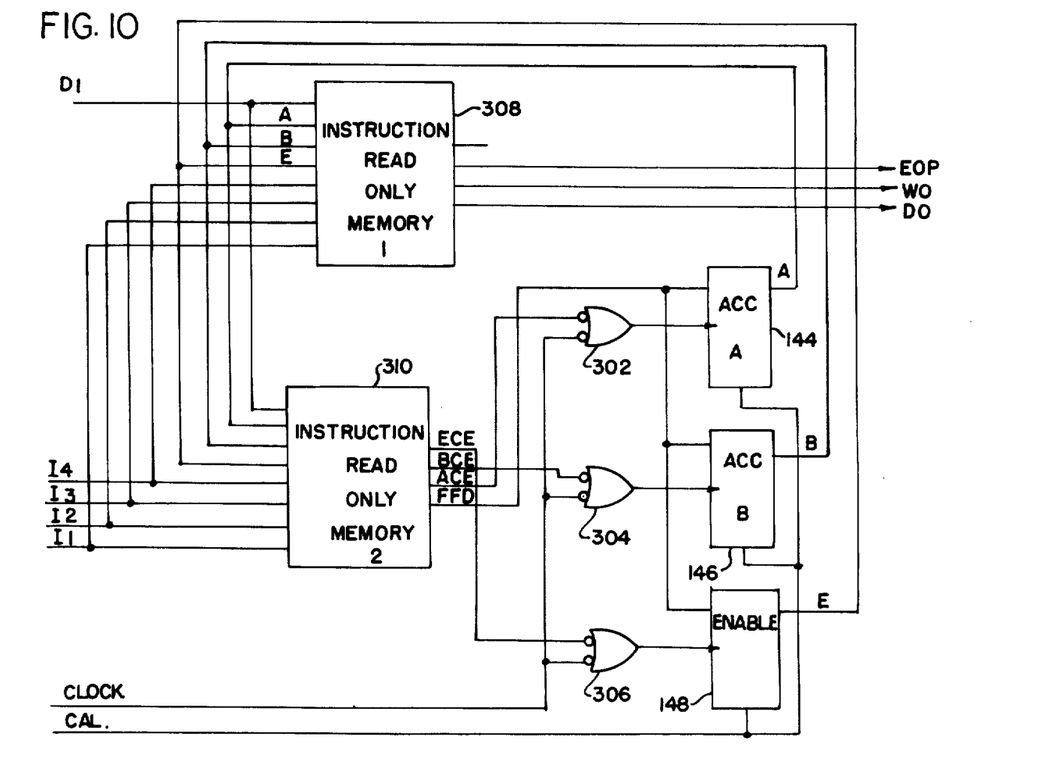
FIG. 10 is a circuit diagram of the preferred embodiment of the Arithmetic Logic using a two read-only memories.

Because the embodied logic has a limited number of data inputs and is only required to perform a limited number of Arithmetic Logic operations, the functions of the Instruction Decoder and Arithmetic Logic may alternatively be performed by a single Read-Only Memory, as illustrated in FIG. 9 or by two smaller Read-Only Memories, as illustrated in FIG. 10.

Referring to FIG. 9, the Instruction Processor comprises an Instruction Memory 300, Accumulator A 144, Accumulator B 146 and Accumulator E 148. Enablement of the three Accumulators are controlled by three associated NOR Gates 302, 304 and 306, as shown. The Instruction Memory 300, which may be a read-only memory similar in construction to the Program memory discussed above or a similar commercially available device, receives the four bit operation code from the Program Memory 112, the Input Data DI from the Input Memory 102, Scratch Pad Memory 106 or Output Memory 104, as specified by the address field portion of the Instruction Word and signals indicative of the state of Accumulator A 144, Accumulator B 146 and Accumulator E 148. These eight inputs combine to define a specific memory location in the Instruction Memory 300 which contains the unique solution of the instructed operation with the input data and the data stored in Accumulators A, B and E, as required. The output of the Instruction Memory is a seven bit word indicative of the solution of the instructed operation and the appropriate input data. The seven bit word may place new data in Accumulators A, B or E or the result may be stored in the Scratch Pad or Output Memory or may be a signal indicative of the end of the program. The first four bits from the Instruction Memory seven bit output word will place data in Accumulator A, B or E in accordance with the input operation code. The first bit on the output lead indicated FFD contains the solution to the instructed operation with the appropriate input data and is applied to the inputs of all three Accumulators 144, 146 and 148. The second bit of the seven digit output word is applied to an input gate of NOR Gate 302 which produces a signal enabling Accumulator A when the second bit is a logical 0. In like manner, the third bit is applied to an input gate NOR Gate 304 which produces a signal to enable Accumulator B and the fourth bit is applied to an input of NOR Gate 306 which produces a signal enabling Accumulator E. The present states of Accumulators 144, 146 and 148 are communicated back to the Instruction Memory 300 as input data, as shown. The results of the instructed operation with the present input data appears on the output lead of the Instruction Read-Only Memory 300 designated DO, like-wise a write output signal appears on the output lead designated WO when the operation code directs the results on the lead designated DO is to be written in the Scratch Pad or Output Memories. The End of the Program Signal appears on the lead designated EOP.

The embodiment of the Instruction Processor illustrated on FIG. 10 is basically the same as that in FIG. 9 except it uses two instruction memories; Instruction Memories I and II, 308, and 310, respectively. Instruction Memory I 308 outputs a four bit word in which the first three bits are indicative of the Output Data (DO), the Write Output Signal (WO), and End of Program (EOP) signal, respectively. The fourth bit is not used. The Instruction Memory II 310 also outputs a four bit word which is applied to Accumulators 144, 146 and 148 and NOR Gates 302, 304 and 306 in a way comparable to the way the first four bits of the output of the Instruction Memory 300 are applied to these same elements in FIG. 9.

Because the four bit operational code and the four data inputs define a unique memory location for any input combination, the output word can be programmed to be a unique solution of the problem. This method eliminates the multi component of the Arithmetic Logic discussed with reference to FIG. 8 to one or two commercially available integrated circuit chips substantially reducing the cost and complexity of the PIC.

MASTER CONTROL

The Master Control 100 contains the necessary circuits to interface the PIC with the Bi-Directional Data and Control Bus of the numerical control machine system. The manufacturers of the N/C Computers supply a set of rules with each computer which permits a person skilled in the art to design interface circuits to mate the particular device with the specific bidirectional and control bus. These interface circuits will vary with the selection of the N/C Computer, however, they are sufficiently well known in the art that they need not be discussed in detail.

AUXILIARY MODES OF OPERATION

In addition to the primary computational mode of operation discussed above, there are four auxiliary modes of operation which increase the overall versatility of the PIC and provide means for automatically checking the operation of the PIC by the N/C Computer. The auxiliary modes of operation and their mode select code number are as follows:

| Mode | Description |
| --- | --- |
| 00 | Primary Computational Mode |
| 01 | Input, Output and Scratch Pad Memory Test |
| 02 | Instruction Processor Test |
| 03 | Program Counter Test |
| 04 | Program Memory Test |

The Primary Computation Mode, Mode 00, is the primary functional mode of the PIC previously discussed in detail above. When the code indicative of Mode 01 is received by the PIC, the N/C Computer is given both read and write access to the Input Memory 102, the Output Memory 104 and the Scratch Pad Memory. In this operational mode, the N/C Computer first loads the three random access memories with predetermined data, then reads this data back in the N/C Computers memory where it is compared with the original data. This mode permits diagnosing suspected faults in the three PIC random access memories. In Mode 02 the PIC program memory is disabled and the N/C Computer is allowed to transmit Instruction Words in sequence and command execution of these instructions by the Instruction Processor. To make use of this mode, predetermined input data must first be loaded into the Input and Scratch Pad Memories via a normal Mode 00 or Mode 01. After the data is transferred to the requisite memory, the Mode 02 signal is initiated and the PIC processes the predetermined data in accordance with the Instruction Words received from the N/C Computer. The results are placed in the Output Memory 104 then transferred to the N/C Computer's memory as in the primary mode of operation. The results stored in the N/C Computer's memory are then compared with the anticipated results to permit diagnosing suspected faults in the Instruction Processor. When the PIC is placed in Mode 03, the N/C Computer has access to the current content of the Program Scanner. In Mode 03, the Program Scanner is sequentially indexed to generate the twelve least significant bits indicative of the Instruction Word address on each page. These addresses are transmitted to the N/C Computer's core memory where they are compared with a like set of addresses generated by the N/C Computer to permit diagnosing suspected faults in the Program Scanner. The fourth mode, Mode 04, is the Program Memory dump which gives the N/C Computer access to the PIC's Program Memory. This mode of operation permits the N/C Computer to read all or any portion of the program stored in the Program Memory.

Although the Programmable Interface Controller has been disclosed with reference to a specific embodiment, it is not intended that the scope of this invention be limited to the circuits illustrated and described herein. It is recognized that a person skilled in the art is capable of designing alternate circuits or using different types of components to perform the same or comparable functions without departing from the spirit of the disclosed herein.

What is claimed is:

1. In combination with a numerical control machine system operative to perform a series of instructions in accordance with a prepared program, said numerical control machine system comprising, a machine for performing the program instructions in response to control signals, sensors detecting the status of selected operational parameters of the machine for generating status data indicative of the present state of the selected operational parameters, a program reader for converting the prepared program into instruction data, a numerical control computer having storage means storing data including said instruction data and said status data and computation means for generating control signals controlling the operation of the machine and the data flow in said numerical control machine system in response to said stored data, and a bi-directional bus transmitting said control signals and status data back and forth between said numerical control computer, said sensors and said machine, an improved programmable interface controller interfacing the numerical control computer through the bi-directional bus to perform many of the routine arithmetic computation and logic functions normally performed by the numerical control computer and other auxiliary processors comprising:

data memory means having a plurality of discrete storage locations for temporarily storing data in said storage locations, each of said storage locations having an identifying multi-bit address field;

instruction generator means for generating series of instruction words in a predetermined sequence in response to a start signal, each of said instruction words comprising an operation code specifying one of a plurality of data manipulation operations to be performed and a address field specifying a specific storage location in said memory means;

instruction processor means for performing said plurality of data manipulation operations in response to said series of instruction words, said instruction processor means sequentially performing arithmetic logic in response to said operational code with the data received from the storage location specified by said companion address field to generate processed data and transferring said processed data back to said data memory means where it is stored in the storage location specified by said companion address field; and master control means interfacing said bi-directional bus for controlling the transfer of data from storage locations in the numerical computer's storage means to storage locations in said data memory means in response to a first control signal generated by the numerical computer, and generating said start signal each time new data transfer has been completed, and for transferring said processor data from said data memory means to said computers storage means in response to a second control signal after all the instructed operations to be performed by the instruction processor have been completed.

2. The combination of claim 1 wherein said data memory means comprises:

input memory means having a plurality of discrete storage locations for temporarily storing said new data transferred from the numerical control computer storage means to said programmable interface controller;

output memory means having a plurality of discrete storage locations for temporarily storing the processed data generated by the instruction processor means.

3. The combination of claim 2 wherein the instruction words generated by said instruction generator means include an operation code indicative of an operation requiring the processed data of a preceding operation to be temporarily stored for use in at least one subsequent operation, said data memory means further includes a scratch pad memory means having a plurality of discrete storage locations for temporarily storing in one of said storage locations the processed data of said preceding operations.

4. The combination of claim 3 wherein input, output and scratch pad memory means are random access memories.

5. The combination of claim 1 wherein said instruction generator means comprises:

program memory means, for outputting said instruction words in response to address signals, said program memory means having a plurality of addressable multi-bit storage locations storing said instruction words; and program scanner means for generating said address signals activating said program memory to output the stored instruction words in said predetermined sequence.

6. The combination of claim 3 wherein said instruction generator means comprises:

program memory means, for outputting said instruction words in response to address signals, said program memory means having a plurality of addressable multi-bit storage locations storing said instruction words; and program scanner means for generating said address signals activating said program memory means to output said instruction words in said predetermined sequence.

7. The combination of claim 6 wherein each multi-bit storage location in said program memory means has at least fourteen binary bit storage locations and wherein the operation code of each instruction word comprises at least four binary bits and said companion address field comprises at least ten binary bits.

8. The combination of claim 7 wherein at least two binary bits of said at least ten binary bits identify the input, output and scratch pad memory means in which the multi-bit storage location is located.

9. The combination of claim 6 wherein said program memory means comprises at least one read only memory storing said series of instruction words in sequential storage locations and said program scanner is a binary counter generating said address signals in said same sequence.

10. The combination of claim 9 wherein said at least one read only means comprises a plurality of serially disposed read only memories, wherein each read only memory comprises a page of instruction words, said program scanner further includes a page decoder responding to the most significant bits of said binary counter to generate signals sequentially enabling said plurality of read only memories, one at a time.

11. The combination of claim 1 wherein said instruction processor comprises:

instruction decoder means for for generating signals indicative of the operation to be performed in response to said operation code;

arithmetic logic means having a plurality of arithmetic logic circuits for performing arithmetic logic operations in response to the signals generated by said instruction decoder means with the data specified by said companion address field to generate said processed data;

accumulator means for temporarily storing the processed data generated by the arithmetic logic means; and gating means for transferring said processed data from said accumulator means to said data memory means where it is stored in response to said decoder means receiving an instruction word directing that said processed data be stored.

12. The combination of claim 11 wherein a series of sequential instruction words require the temporary storage of more than one bit of processed data said accumulator means comprises:

accumulator A temporarily storing the processed data of one operation performed by said arithmetic logic means; and accumulator B temporarily storing the processed data of a different operation performed by said arithmetic logic means.

13. The combination of claim 12 wherein a series of sequential instruction words requires the processed data of a prior operation have a predetermined state prior transferring the processed data stored in accumulator A and accumulator B to said data memory means, said accumulator means further includes:

accumulator E for storing the processed data of said prior operation; and gate means for gating the processed data stored in accumulators A and B to said data memory means in response to the processed data stored in accumulator E having said predetermined state and said decoder means receiving an instruction word directing the processed data stored in accumulators A and B to be transferred to said data memory means.

14. The combination of claim 13 wherein the data stored in the storage location specified by the instruction word companion address field is data D and the signal generated by said instruction decoder means in response to an operation code is a signal appearing at one of a plurality of output terminals designated, ADA, ADCA, ODA, ODCA, LAD, LADC, CA, LBD, LBA, PED and PEA, said arithmetic logic means comprises:

inverter circuit means receiving said data D for generating a signal indicative of the complement of the data D;

first circuit means for generating processed data indicative of the logical AND of said data D and the processed data stored in accumulator A and transferring said generated processed data to accumulator A in response to a signal generated by said instruction decoder means at said output terminal designated ADA, second circuit means for generating processed data indicative of the logical AND of the complement of data D and the processed data stored in accumulator A and transferring said generated processed data to accumulator A in response to a signal generated by said instruction decoder means, at said output terminal designated ADCA;

third circuit means for generating processed data indicative of the logical OR of data D and the processed data stored in accumulator A and transferring said generated processed data to accumulator A in response to a signal generated by said instruction decoder means at said output terminal designated ODA;

fourth circuit means for generating a processed data indicative of the logical OR of the complement of data D and the processed data stored in accumulator A and transferring said generated processed data to accumulator A in response to a signal generated by said instruction decoder means at said output terminal designated ODCA;

sixth circuit means for transferring said data D to accumulator A in response to a signal generated by said instruction decoder means at said output terminal designated LAD;

seventh circuit means for transferring the complement of data D to accumulator A in response to a signal generated by said instruction decoder means at said output terminal designated LADC;

eighth circuit means for transferring the complement of processed data stored in accumulator A to accumulator A in response to a signal generated by the instruction decoder means at said output terminal designated CA;

ninth circuit means for comparing in response to a signal generated by the instruction decoder means at said output terminal designated CMDA, data D with the processed data stored in accumulator A to generate compared processed data having a first state when state of data D and the state of processed data stored in accumulator A are alike, and a second state when state of data D and the state of the processed data stored in accumulator A are different, said ninth circuit means further transferring said compared processed data to accumulator A;

tenth circuit means for transferring data D to accumulator B in response to a signal generated by said instruction decoder means at said output terminal designated LBD;

eleventh circuit means for transferring the processed data stored in accumulator A to accumulator B in response to a signal generated by said instruction decoder means at said output terminal designated LBA;

twelfth circuit means for transferring data D to accumulator E in response to a signal generated by said instruction decoder means at said output terminal designated PED; and thirteenth circuit means for transferring the processed data stored in accumulator A to accumulator E in response to a signal generated by said instruction decoder means at said output terminal designated PEA.

15. The combination of claim 6 wherein said instruction processor means comprises:

instruction decoder means for decoding said operation code to generate signals indicative of the operation to be performed;

arithmetic logic means having a plurality of arithmetic logic circuits for performing the desired arithmetic logic with the data stored in the storage location specified by the companion field address to generate said processed data in response to the signals generated by said instruction decoder means;

accumulator means for temporarily storing the processed data generated by said arithmetic logic means; and gating means for gating said processed data stored in said accumulator means to the storage location specified by the companion address field in response to said decoder means receiving an instruction word directing said processed data be stored in said scratch pad or output memory means.

16. The combination of claim 6 wherein the data stored in the storage location specified by the instruction word companion address field is data D, said instruction processor means comprises:

accumulator A means for storing the processed data of at least one minor operation;

accumulator B means for storing the processed data of at least one other prior operation, different from the operation placing results in accumulator A;

accumulator E means for storing the processed of a third prior operation, different from the operation placing processed data in accumulator A and accumulator B, the state of the processed data stored in accumulator E enabling and disabling the transfer of data from accumulators A and B to said scratch pad and output memory means as specified by said companion address field; and instruction memory means in feedback circuit relationship with said accumulators A, B and E and storing processed data indicative of the operations specified by said operational code with the data in the storage location specified by said companion address field and the processed data stored in accumulators A, B and E for outputting said stored processed data to said accumulators A, B and E in response to said operational code and for outputting said processed data stored in accumulators A and B to said scratch pad memory and said output memory in response to said operation code and the processed data in accumulator E having a predetermined state.

17. The combination of claim 16 wherein operational code, data D and the processed data stored in accumulators A, B and E comprise an input address signal said instruction memory means is a read-only memory having a plurality of addressable multi-bit storage locations storing processed data indicative of the operation specified by said input address signal, said read only memory having a plurality of input terminals individually receiving said operation code, said data D and the processed data in accumulators A, B and E and a plurality of output terminals, each of said output terminal receiving a processed data stored in the multi-bit storage location specified by said input address signal, the output terminal receiving the data bit indicative of the end of the program is connected to said master control and instruction generator means, the output terminals receiving the data bits indicative of the processed data to be stored in the data memory means are connected to both the scratch pad and output memories, the output terminal receiving processed data to be stored in one of the accumulators is connected to the inputs of accumulators A, B and E, and the remaining output terminals receiving data bits indicative of the accumulator in which the result is to be stored are connected to the respective accumulators.

18. The combination of claim 6 wherein said numerical control computer includes means for testing the input, output and scratch pad memories, the instruction processor means, the program scanner means and program memory means, and wherein the control signals generated said numerical control computer includes test mode signals indicative of the components in the programmable interface controller to be tested, said master control means further includes switch means responsive to said test mode signals for giving numerical control computer direct access to the input, output and scratch pad memories, the read only memory in the instruction processor means, the counter in the program scanner means and the read only memory in the program memory means, to perform said tests.

* * * * *